United States Patent [19]

De Filippo

[11] 4,341,357
[45] Jul. 27, 1982

[54] WINDING CORE FOR MAGNETIC TAPE ADAPTED FOR STACKING

[75] Inventor: Joseph De Filippo, Monroe, Conn.

[73] Assignee: CBS Inc., New York, N.Y.

[21] Appl. No.: 191,052

[22] Filed: Sep. 25, 1980

[51] Int. Cl.³ ............................................ B65H 75/18
[52] U.S. Cl. .................................. 242/68.5; 206/394; 206/509
[58] Field of Search ................... 242/68.5, 71.8, 118.3, 242/118.31, 118.41; 206/391, 394, 389, 503, 509

[56] References Cited

U.S. PATENT DOCUMENTS

| | | | |
|---|---|---|---|
| 4,069,914 | 1/1978 | Damsky | 206/394 |
| 4,081,151 | 3/1978 | Ender | 206/394 |
| 4,201,353 | 5/1980 | Schor | 242/68.5 |
| 4,280,670 | 7/1981 | Schor | 242/68.5 |

*Primary Examiner*—Edward J. McCarthy

[57] ABSTRACT

A flangeless winding core for magnetic tape, adapted for stacking between like winding cores, has an annular body with parallel top and bottom annular surfaces, an outer circumferential surface around which the tape is wound, and an inner circumferential surface from which a plurality of angularly spaced lugs extend radially inward, the inner ends of which are curved to define a discontinuous inner circumferential core surface. The lugs have the shape of a sector of an annulus, are spaced from each other by a like number of similarly shaped gaps, and project equally above the top and bottom surfaces of the annular body a distance greater than one-half the axial dimension of the annular body. The top and bottom surfaces of the lugs are parallel to each other and slope relative to the median plane of the annular body, thereby to maximize the effective axial length of the discontinuous inner circumferential core surfce while permitting stacking of the annular body surfaces against one another, with the lugs mating with the gaps of a nesting core, and enables tape having a width approximately the same as the axial dimension of the outer circumferential surface to support the tape wound about an adjacent core when the cores are stacked.

9 Claims, 3 Drawing Figures

WINDING CORE FOR MAGNETIC TAPE ADAPTED FOR STACKING

BACKGROUND OF THE INVENTION

This invention relates to flangeless winding cores for magnetic tape, adapted for stacking with their surfaces in contact and the tapes wound thereabout in supporting contact.

The recording of sound on magnetic tape and the packaging and marketing of such tape recordings has become a large-scale industry incorporating many mass production techniques. The blank tape is provided by the tape manufacturer in lengths of up to several thousand meters wound about a standardized flangeless winding core, such units of blank tape being known in the trade as "pancakes" which may have a diameter up to fifteen inches (38 cm) or more. The tapes are supplied in this form to cassette manufacturers and recording studios where they are recorded and packaged according to their particular purpose. The standard core, originally standardized for ¼" (6.3 mm) tape, is a flangeless plastic ring having an axial height of 8.9 mm (0.350 in.) because the holding devices of the sophisticated and expensive machines used for processing the "pancake" units are mainly adjusted to this width. In view of the difference between the width of the winding surface of a core having this height and the width of the standard cassette tape, unless the core is designed to take this difference into account, it is necessary to insert rings of foam or cardboard between the stacked reels of tape for transport so that the individual reels will not be deformed by the jarring and jolting to which they are likely to be subjected in transport.

Two factors are of particular importance in the design of a winding core to eliminate the need for packing materials while at the same time ensuring their proper handling on existing processing machinery. First, the core should enable stacking of such cores with tape wound therearound, but without intervening support material between the tape on adjacent cores, to reduce bulk and cost of transporting and handling the cores and tape. Secondly, the expensive and sophisticated machinery utilized in processing the tape usually employs core holding devices adjusted to the standard 8.9 mm (0.350") core height, thus creating a significant design requirement. Briefly, to achieve the desired stacking efficiency, the core should have a height approximately equal to the width of the tape wound therearound, or 3.81 mm (0.150") for the tape used in compact cassettes. On the other hand, to permit processing of the "pancake" on existing expensive machinery, a core height at the centerhole greater than the width of standard 3.81 mm (0.150") and 6.3 mm (0.25") tapes is required; specifically, the height of the core at its standard 3-inch (7.62 cc) centerhole desirably should be 8.9 mm (0.350 inch) to conform to the current standard norm for existing processing machinery.

These somewhat contradictory requirements are addressed in Ender et al U.S. Pat. No. 4,081,151 by providing deformations which alternately project upwardly and downwardly from the median plane of an annular core body by half the total height of the core, the deformations on the two sides of the core being interlockable with each other when the cores are stacked so that the winding surfaces of adjacent cores are situated closely adjacent one another. These deformations have a rather complex undulating shape, and since the outwardly facing surfaces of the projections are inclined at an angle of about 60°, a core is not positively locked with an adjacent core stacked therewith and may lead to the inability of the stacked cores to withstand forces which might tend to rotate the cores relative to one another. In other words, because of the shallow locking angle between interlocking deformations, the cores are subject to being forced out of interlocking relationship and to be axially displaced from each other upon application of forces tending to cause relative rotation of stacked cores.

In another embodiment disclosed by Ender et al, the winding core has a ridge-valley configuration along the top and bottom of the core, and indentations along a ridge are provided to receive pins projecting from a mating valley to prevent relative rotation of adjacent cores. This embodiment has the disadvantage, however, that the core can only be stacked one way up; that is, the elevated side of one core of the stack must always be placed in the recessed surface of the other.

The problem of satisfying the stacking and processing requirements for tape winding cores is also addressed in Schor U.S. Pat. No. 4,201,353, by providing an annular body having an outer circumferential surface on which the tape is wound and a center hole around which a multiplicity of recesses are uniformly distributed. A set of six opposed projections extend upwardly and downwardly from the top and bottom surfaces of the annular body, the projections being arranged in a circular array adjacent the centerhole and spaced for mating with every third recess along the array of recesses of a sandwiching core. In the disclosed embodiment, the projections rise 2.46 mm (0.097") above the level of the top and bottom surfaces which, when added to a body thickness of 3.96 mm (0.156") gives a total height of 8.88 mm, substantially equal to the 9.9 mm (0.350") standard. In spite of its meeting this aspect of the standard, the commercial version of the Schor winding core tends to slip on the driving hub of existing processing machinery, probably because the overall height of the projections is 0.312", not the 0.350" disclosed in the patent, and thus not sufficient adequately to engage the hub.

SUMMARY OF THE INVENTION

The present invention satisfies the stacking and processing requirements for winding cores used in a mass production environment with a significantly simpler and less expensive structure than known cores of this type. This is achieved by providing a plurality of equidistantly angularly spaced lugs which extend radially inward from the inner circumferential surface of an annular body and project equally from the top and bottom surfaces of the annular body for mating with a like plurality of open gaps between the lugs of an adjacent core in a stack of such cores, with selected equidistantly angularly spaced lugs having a recess for receiving a spindle of existing processing machinery.

In accordance with the invention, a winding core for magnetic tape, adapted for stacking either side up between like first and second nesting cores, has an annular body with parallel top and bottom surfaces, an outer circumferential surface around which the tape is wound, and an inner circumferential surface from which a plurality of equidistantly angularly spaced lugs extend radially inward, the lugs being circumferentially spaced apart by a like plurality of gaps generally corresponding in shape and dimensions to that of the lugs.

Each lug projects equally above the level of the top and bottom surfaces of the annular body a distance greater than one-half the height of the outer circumferential surface, and their inner ends are curved to define an interrupted circle equal in diameter to the standard centerhole for cores of this type. Typically, the core has six lugs, each subtending a circular arc of slightly less than 30°, separated from each other by a gap subtending a circular arc of slightly more than 30°. Three lugs angularly spaced from each other by 120° have axially extending recesses formed therein for receiving a spindle along the core.

An important feature of the winding core is that the opposed surfaces of the lugs are parallel to each other and slope relative to the median plane of the annular body, thereby to maximize the effective axial height of the inner circumferential core surface while permitting stacking of the annular body surfaces against one another with the lugs mating with the gaps of a nested core. This enables tape having a width approximately the same as the height of the outer circumferential surface to support the tape wound about an adjacent core when the cores are stacked.

BRIEF DESCRIPTION OF THE DRAWINGS

Other objects, features and advantages of the invention will become apparent, and its construction and operation better understood, from the following detailed description, taken in conjunction with the accompanying drawings, in which.

DESCRIPTION OF THE PREFERRED EMBODIMENT

Figure 1:
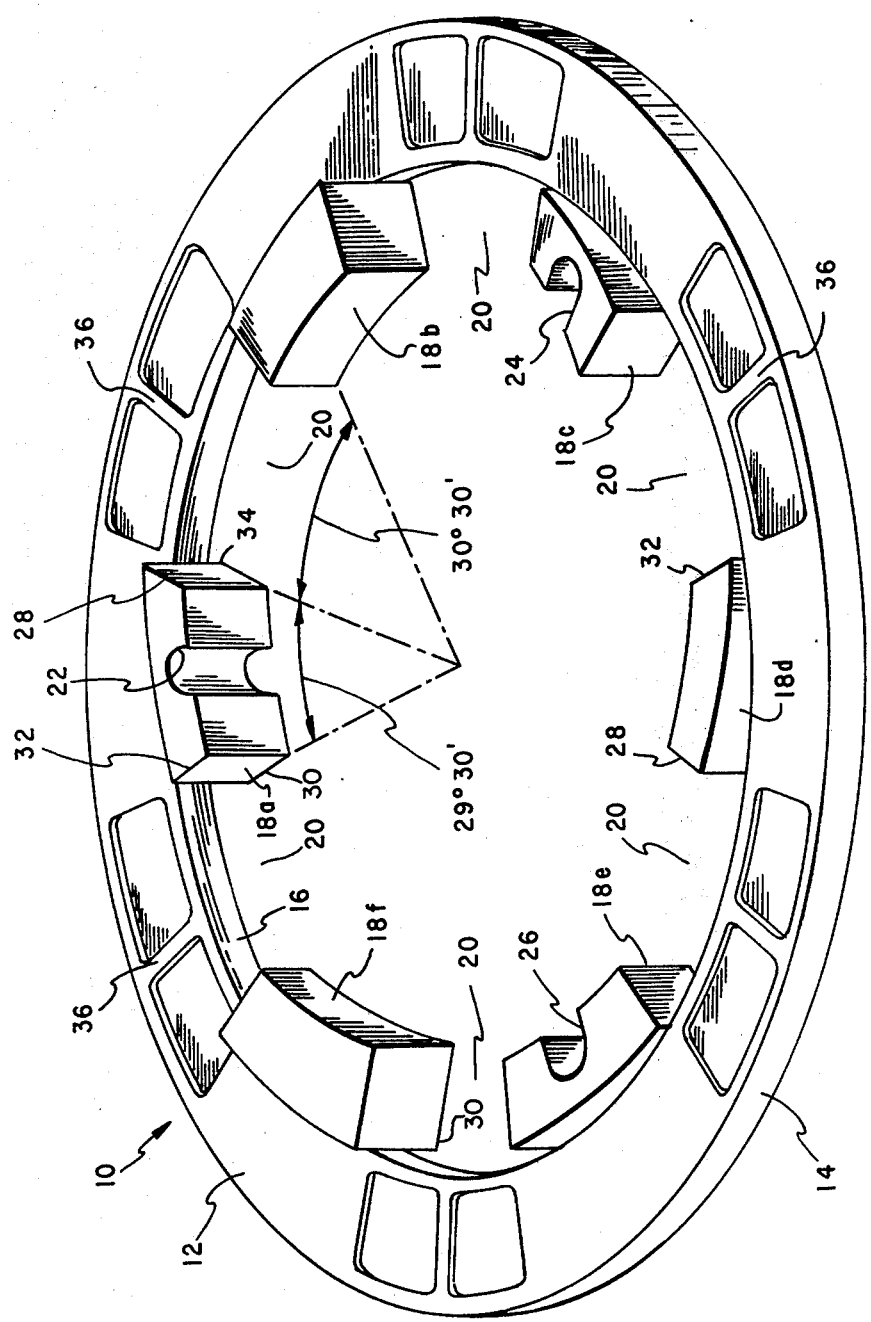
FIG. 1 is a perspective view of a tape winding core in accordance with the invention.

Referring to FIG. 1, a winding core 10 in accordance with the invention, shown approximately twice actual size, has a substantially annular body 12 having an outer circumferential surface 14 about which the magnetic tape is to be wound, and an inner circumferential surface 16. In conformance with the aforementioned industry standard, outer circumferential surface 14 has a diameter of 4.5" (11.33 cm), and its height is approximately equal to the width of the tape to be wound on the core. Thus, for a standard 3.81 mm (0.150") tape, the height of the outer circumferential surface 14 would typically be approximately 3.86 mm (0.152").

In the processing of the magnetic tape wound on the core, that is to say, for initial winding of tape on the core and subsequent despooling, a holding device in the form of a hub would typically be disposed inside the core for frictional engagement with an inner circumferential core surface, and at times, a spindle may also be employed to rotate the core. To satisfy these aspects of the processing machinery and to permit stacking of several cores with tape wound therearound, a plurality of lugs 18a, 18b, 18c, 18d, 18e and 18f, that is, six in the illustrated exemplary embodiment, extend radially inwardly from the inner circumferential surface 16 of annular body 12, the innermost ends of which are curved to define a discontinuous circular inner core surface for engagement by the hub of the processing machine. The diameter of the inner core surface is equal to the diameter of the standard centerhole for hubs of this type, namely, three inches (7.62 cm). In plan, each of lugs 18a–18f is a sector of an annulus subtending an arc typically of 29° 30", and are angularly spaced apart by a like plurality of gaps 20 of the same shape each subtending a circular arc of 30° 30"; making the gaps slightly larger than the lugs facilitates insertion therein of the lugs of adjacent stacked cores. Three of the lugs 18a, 18c and 18e, which are angularly displaced from each other by 120°, have recesses 22, 24 and 26, respectively, formed therein which extend between the top and bottom surfaces, for accommodating a spindle to rotate the core.

An important detail in the construction of the winding core is that the top and bottom surfaces of the lugs are parallel to each other but are inclined slightly, in the same direction, relative to the median plane of annular body 12, and are respectively displaced from the top and bottom surfaces of body 12 at the point of maximum displacement by a distance which is greater than one-half the axial dimension of the circumferential winding surface 14.

Typically, at the points 28 and 30 of greatest projection from the top and bottom surfaces, respectively, of annular body 12 each lug rises 2.54 mm (0.10") above the level of the adjacent annular surface of body 12, and at the points 34 and 32 of least projection the distance from the adjacent annular surface of body 12 is typically 0.122 mm (0.048"), thus giving the discontinuous inner circumferential core surface an effective axial height of 0.894 mm (0.352") for the previously indicated body thickness of 3.86 mm (0.152").

To provide the desired height for the outer circumferential surface 14, the spacing between the top and bottom surfaces of annular body 12 at the outer circumferential surface is uniform along the axial dimension of the core, such spacing typically being 3.86 mm (0.152") as previously indicated. The same spacing exists at the inner circumferential surface 16 of body 12, and additionally along a multiplicity of opposed strengthening ribs 36 extending radially between the inner and outer circumferential surfaces. The remainder of the area of annular body 12 is somewhat thinner, to conserve material, and for the indicated dimensions typically has a thickness of 1.06 mm (0.042").

To provide a core structure with the indicated thickness variation, it is conveniently made of a plastic material, and may be injection molded or die-cast. However, other materials, including metals and wood, could also be employed.

Figure 3:
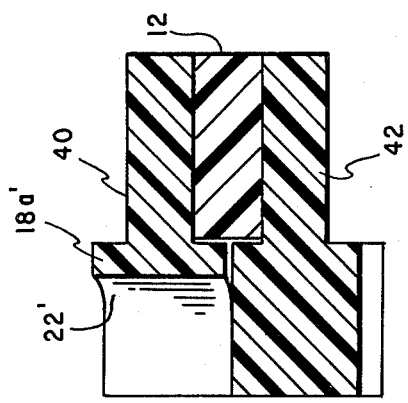
FIG. 3 is the view of FIG. 2, but unexploded and partially broken away, and taken with reference to the line 3—3 of FIG. 2.
Figure 2:
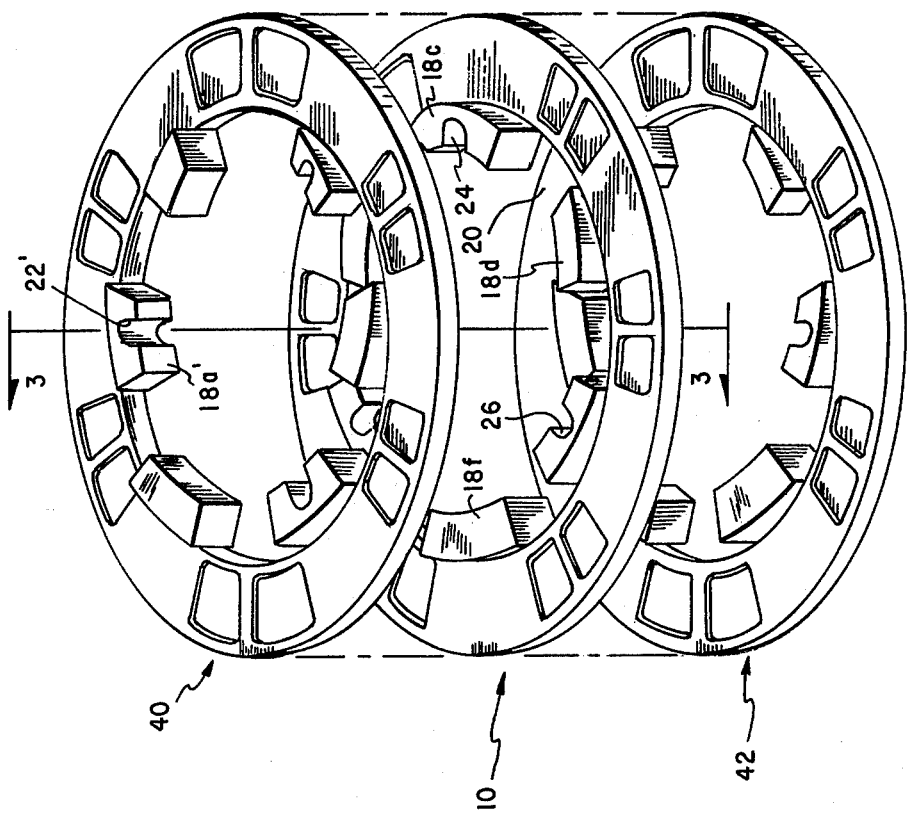
FIG. 2 is an exploded perspective view of three of the winding cores shown in stacked relationship.

Referring to FIGS. 2 and 3, the winding core 10 of FIG. 1 is shown sandwiched (exploded from such sandwiching in FIG. 2) between an identical upper nesting core 40 and an identical lower core 42. It will be evident from FIG. 2 that the angular spacing of the lugs and gaps is such that each of the lug projections from each of the annular surfaces of body 10 is adapted for mating with any of the array of six gaps of an adjacent core. This kind of mating interaction facilitates the nesting of cores in that a relative rotation between adjacent cores of no more than about 30° is required to effect mating of the lug projections of one core with the gaps of an adjacent core. Although the high points of the lug projections extend from the adjacent surface of the annular body a distance which is greater than one-half the spacing between the top and bottom annular surfaces, the high points of upwardly extending projections of the lugs of core 42 (for example) nest into the low points of the downwardly extending projections of the lugs of the upper core 40, allowing both projections to be received within a gap 20 of the sandwiched core 10, with their mating surfaces fully contacting each other, while at the same time allowing the annular surfaces of the sandwiched core to contact the adjacent surfaces of the sandwiching cores, as shown in FIG. 3. The height of the lug projections permitted by the described arrangement, together with the fact that the vertical edges of each lug projection closely mate with the vertical lug edges that define the gaps, facilitates the locking of a core with an adjacent core and enhances the capability of the stacked cores to withstand forces which might tend to rotate the cores relative to one another. Since the annular surfaces of the sandwiched cores contact each other, no filler is required between adjacent "pancakes" of wound tape, and rotation of one sandwiched core relative to another can occur only if a core is axially displaced from its adjacent interlocking core a distance greater than the maximum projection of the lugs from the adjacent annular surface, an unlikely event if the sandwiched cores are suitably clamped together prior to shipment.

While the invention has been described as applied to a winding core for tape 0.150" (3.81 mm) wide, the same interlocking features can be designed into a winding core for ¼-inch (6.3 mm) tape in which the spacing between the top and bottom surfaces of the annular body 12 would be slightly greater than 0.250" (6.3 mm). Further, it will be appreciated that changes in details of the described embodiment may be made without departing from the spirit of the invention. For example, it is not essential that the core have the disclosed six lugs angularly spaced apart by six gaps; alternatively, the core may have a number of lugs (and gaps) which is divisible by three, for example, three, nine or twelve. The disclosed choice of six lugs gives the structure more rigidity than when three are used, and makes easier the nesting of one core into another than if nine (or more) were used. Also, although the annular body of the illustrated hub is thicker in some parts than others, primarily to effect a saving in material, the body may be of uniform thickness throughout for greater strength, to withstand the hoop stresses due to tension in the tape during the winding operation.

I claim:

1. A winding core for magnetic tape, adapted for nesting between like first and second sandwiching cores, comprising:

an annular body having first and second substantially parallel annular surfaces, an outer circumferential surface for winding tape therearound having a height substantially equal to the width of the tape, and an inner circumferential surface from which a plurality of lugs extend radially inwardly, each of which lugs has a cross-sectional shape, at the median plane of said annular body, of a sector of an annulus, and being spaced from adjacent lugs by gaps which have substantially the same shape and dimensions as said lugs, said lugs each projecting equally from the said first and second annular surfaces of said body, over at least a portion of its circumferential dimension, a distance which is greater than one-half the height of said outer circumferential surface, each of the lug projections from the first annular surface for mating with a gap of the first sandwiching core and each of the lug projections from the second annular surface for mating with a gap of the second sandwiching core, the innermost end of said lugs being circularly curved and together defining a discontinuous inner circumferential core surface.

2. A winding core as defined in claim 1, wherein each of said lugs has first and second substantially parallel top and bottom surfaces, each having the shape of a sector of an annulus, inclined at an angle relative to the median plane of said annular body, and wherein the projections of said top and bottom surfaces at the point of maximum displacement from the adjacent annular surface of said annular body is greater than one-half the height of said outer circumferential surface.

3. A winding core as defined in claim 1 or claim 2, wherein said plurality is a number divisible by three.

4. A winding core as defined in claim 3, wherein said plurality is six and each of said lugs subtends an arc of slightly less than 30°, and each of said gaps subtends an arc slightly greater than 30°.

5. A winding core as defined in claim 3, wherein each of three lugs angularly displaced from each other by 120° has a recess formed therein extending between its said top and bottom surfaces and intersecting the said inner core surface thereof.

6. A winding core as defined in claim 4, wherein each of three lugs angularly displaced from each other by 120° has a centrally disposed recess formed therein which extends axially between its said top and bottom surfaces and intersecting the said inner core surface thereof adapted to receive driving pins of a processing machine on which the core is to be received.

7. A winding core as defined in claim 1 with a magnetic tape wound thereon which has a width equal to or not significantly less than the height of said outer circumferential surface.

8. A winding core for magnetic tape, adapted for nesting between like first and second sandwiching cores, comprising:

a substantially annular body having first and second substantially parallel annular surfaces, an outer circumferential surface for winding tape therearound having a height substantially equal to the width of the tape, and an inner circumferential surface from which a plurality of lugs extend radially inwardly, each of which lugs has a cross-sectional shape, at the median plane of said annular body, of a sector of an annulus, and being spaced from adjacent lugs by gaps which have substantially the same shape and dimensions as said lugs, said lugs each projecting substantially equally from the said first and second annular surfaces of said body a distance which is greater, over at least a portion of its circumferential dimension, than one-half the height of said outer circumferential surface, each of the lug projections from the first annular surface for mating with a gap of the first sandwiching core and each of the lug projections from the second annular surface for mating with a gap of the second sandwiching core.

9. A winding core as defined in claim 1, wherein said plurality is a number divisible by three, wherein each of said lugs has substantially parallel top and bottom surfaces, each of which surfaces has the shape of a sector of an annulus, inclined at an angle relative to the median plane of said annular body, and wherein the projection of said top and bottom surfaces at the point of maximum displacement from the adjacent annular surface of said annular body is greater than one-half the height of said outer circumferential surface.

* * * * *